United States Patent [19]

Hanson

[11] 4,342,146
[45] Aug. 3, 1982

[54] METHOD FOR WIDENING AN AUTOMOTIVE VEHICLE

[75] Inventor: Dale M. Hanson, Anaheim, Calif.

[73] Assignee: Wide One Corporation, Anaheim, Calif.

[21] Appl. No.: 124,535

[22] Filed: Feb. 25, 1980

[51] Int. Cl.³ .................... B23P 6/00; B62D 21/14
[52] U.S. Cl. .................................. 29/416; 280/785;
    180/89.1; 296/26; 296/178; 244/120; 29/401.1
[58] Field of Search ............... 29/401.1, 155 R, 412,
    29/415, 416, 520, 526.4, 428; 280/785;
    180/89.1; 296/178, 196, 20, 26, 24 R; 244/120,
    124; 105/393

[56] References Cited

U.S. PATENT DOCUMENTS

| | | | |
|---|---|---|---|
| 1,230,436 | 6/1917 | Schluer | 296/26 |
| 1,327,883 | 1/1920 | Schluer | 296/26 |
| 1,965,451 | 7/1934 | Brown | 296/24 R |
| 2,278,450 | 4/1942 | Jones | 296/26 X |
| 3,245,714 | 4/1966 | Blair | 296/26 |
| 3,309,759 | 3/1967 | Vittone | 29/401.1 X |
| 3,479,724 | 11/1969 | Kruizenga et al. | 29/412 X |
| 3,487,532 | 1/1970 | Phillips | 29/415 |
| 3,543,369 | 12/1970 | Baker | 29/401.1 X |
| 4,231,144 | 11/1980 | Bernacchia, Jr. | 29/401.1 |

Primary Examiner—Lowell A. Larson
Attorney, Agent, or Firm—Fulwider, Patton, Rieber, Lee & Utecht

[57] ABSTRACT

A method for widening an automotive vehicle by cutting through the vehicle components along a cut line having a predetermined orientation which facilitates salvaging and remounting of certain components, and reattaching of the cut portions after the cut portions have been moved apart a predetermined stretch distance. Spacer components are attached between the cut portions of certain ones of the vehicle components to bridge the stretch distance therebetween. The cut line is located to the right of the vehicle engine and heater/air conditioner assembly to eliminate disruption of interconnections therebetween. The original dash mount is refabricated and an adapter is mounted to it to provide a substitute pair of hood mounts for remounting the original hood, new panels being provided to bridge the stretch spaces around the remounted hood.

5 Claims, 10 Drawing Figures

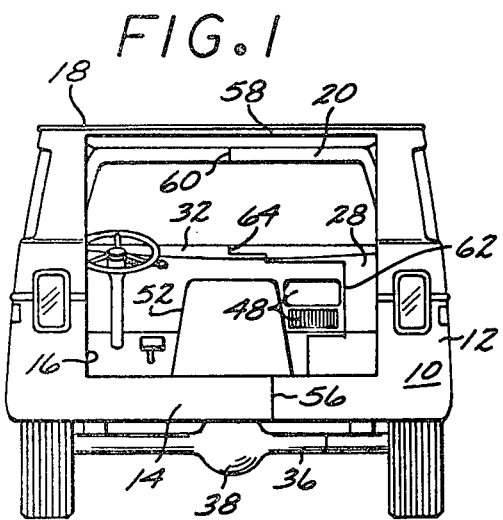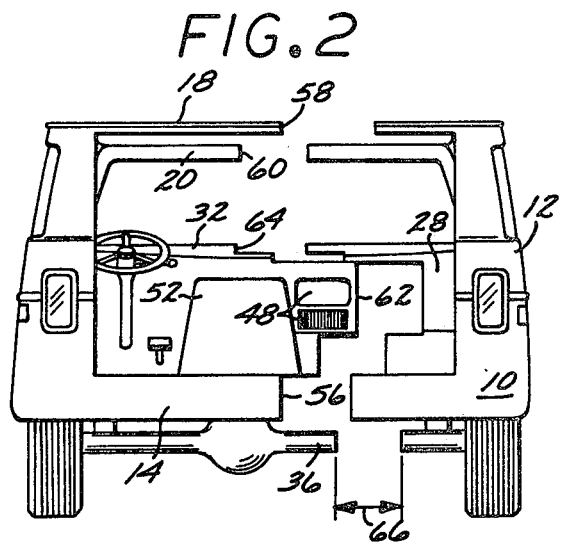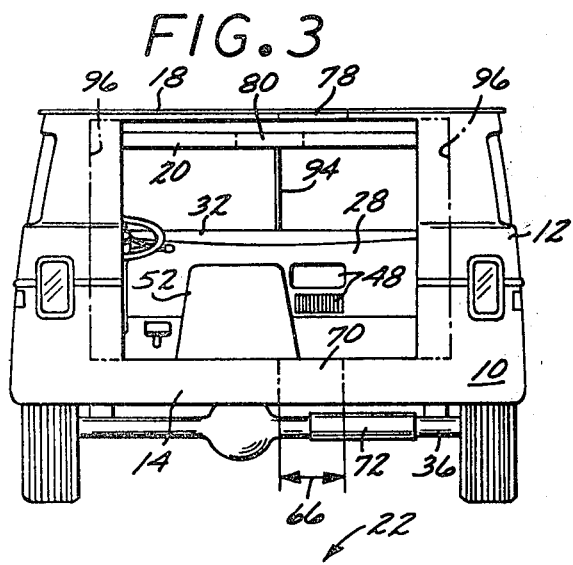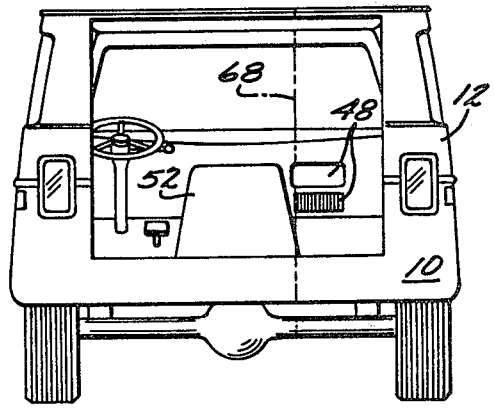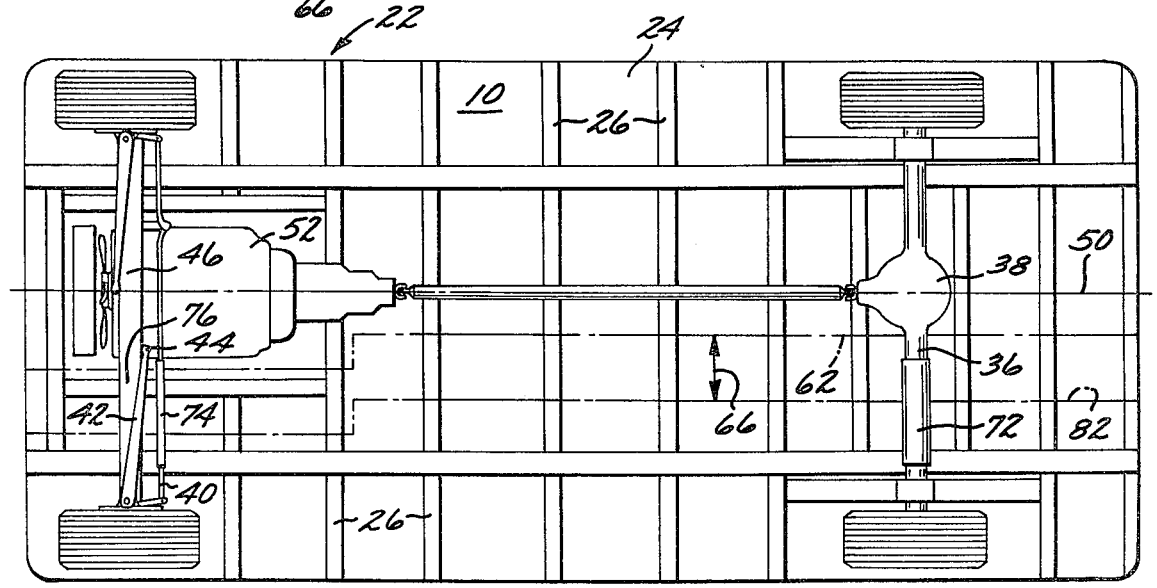

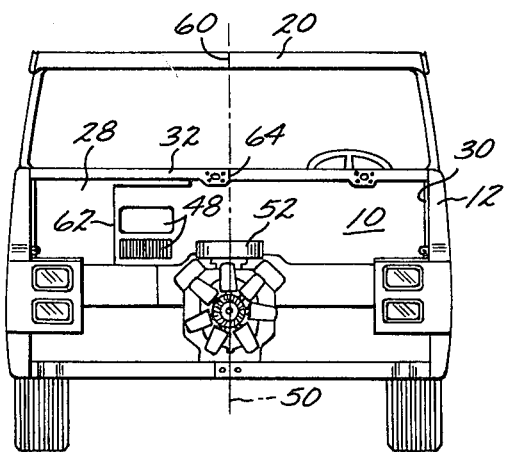
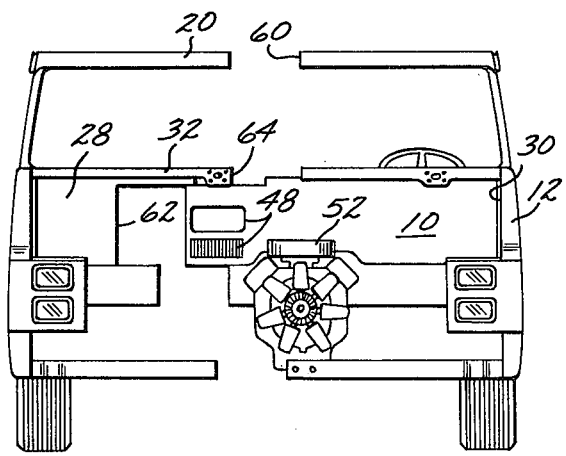
FIG.6  FIG.7
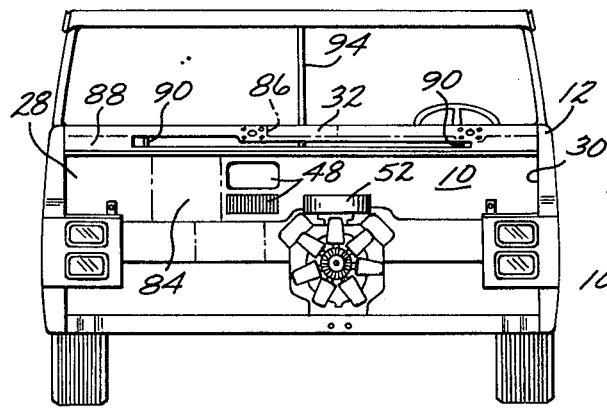
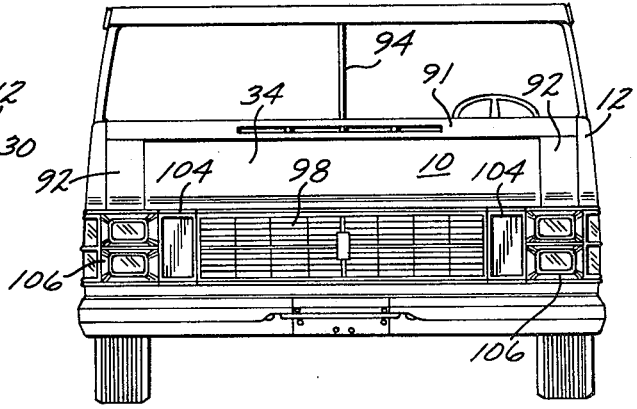
FIG.8  FIG.9
FIG.10
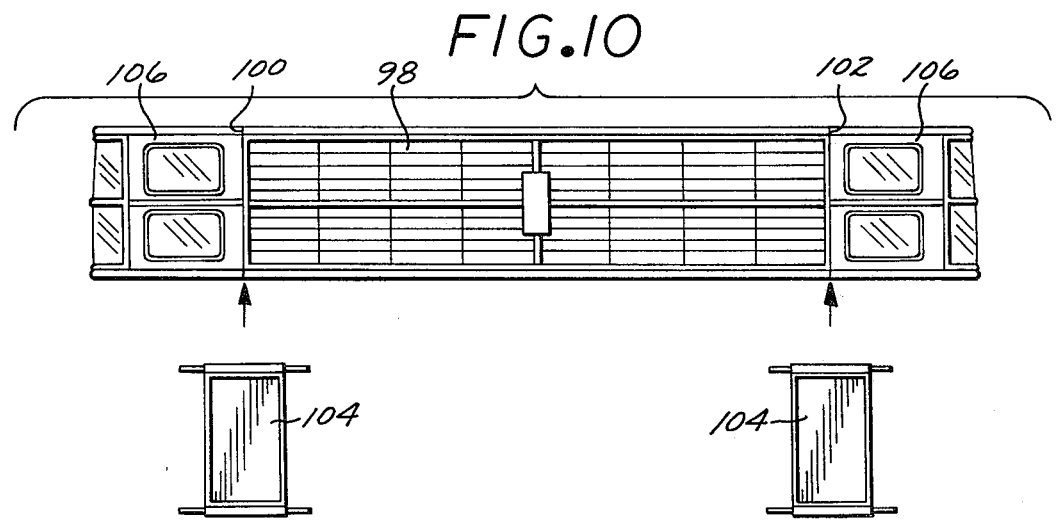

METHOD FOR WIDENING AN AUTOMOTIVE VEHICLE

BACKGROUND OF THE INVENTION

1. Field of the Invention

The present invention relates to a method for widening an automotive vehicle.

2. Description of the Prior Art

Automobile manufacturers currently market a vehicle known as a van which is popular for use in family camping. For such an application, the interior of the van is usually fitted with an arrangement of items such as sleeping bunks, tables, storage cabinets, sinks, and the like. In most arrangements, such items are grouped around and on opposite sides of a central aisle which is inconveniently narrow. It has been found that adding as little as 12 or 14 inches to the width of the aisle provides a surprisingly great improvement in the available space, especially when a higher or vaulted roof is added to improve headroom. Consequently, it is popular to alter or stretch vans to provide this additional width, particularly since this can be done without violating existing highway regulations.

Such stretched vehicles are now widely used, not only for family camping and the like, but for more vital applications, such as for motel and hotel airport ground transportation, for transporting the elderly and handicapped, for tour buses, for transportation pool vans, for ambulances, and for school buses. The additional stretch width in these vehicles makes possible a variety of seating arrangements, each tailored to the particular application.

The foregoing market for stretched automotive vehicles is adversely affected by the costs of modifying the originally manufactured vehicle.

Heretofore, such vehicles have been modified by utilizing one of at least two cut line systems. In one system, two longitudinal cut lines are made, one on each side of the vehicle, just inside the wheel attachments to the axles. Such twin cut lines involve considerable expense and time, involving attachment of spacer elements at both sides of the vehicle to bridge the stretched distances.

In another prior art cut line system, one cut line is made to the right of the longitudinal centerline to pass around the vehicle engine. This single cut line system is more economical than twin cut lines, but it passes through many cables and other interconnections between the engine and the heater/air conditioner assembly, and these all have to be replaced or extensions have to be added to them. The cut line passed through the dash mount in such a way that refabrication of the dash mount to precisely locate the mounting points for the original hood at the proper distance was extremely difficult. This greatly increased the time and expense required to salvage and remount the original hood.

SUMMARY OF THE INVENTION

According to the present invention, a method is provided for widening an automotive vehicle in an economical, expeditious fashion. The method includes the steps of cutting through the automotive vehicle along a predetermined cut line passing through the various vehicle components, and including a cut offset to pass to the right of the usual heater/air conditioner assembly whereby the multiplicity of interconnections with the engine are not disturbed.

The orientation of the predetermined cut line also facilitates use of the original vehicle door or doors, grill, and the hood, and adapter means are used which incorporate precisely spaced apart and otherwise located hood mounts which make easy the mounting of the original hood.

Various modifications and changes may be made with regard to the foregoing detailed description without departing from the spirit of the invention.

BRIEF DESCRIPTION OF THE DRAWINGS

FIG. 1 is a rear elevational view of an automotive vehicle prior to stretching;

FIG. 2 is a view similar to FIG. 1 after stretching;

FIG. 3 is a view similar to FIG. 2, and schematically indicating the location of the spacer for bridging or otherwise compensating for the openings or stretch distances shown in FIG. 2;

FIG. 4 is a rear elevational view of the location of the cut line of a prior art system for stretching automotive vehicles;

FIG. 5 is a plan view of the underside of the vehicle of FIG. 3;

FIGS. 6–8 are front elevational views corresponding to the rear elevational views of FIGS. 1–3;

FIG. 9 is a view similar to FIG. 8, but illustrating the vehicle as it would appear after installation of the hood and grill and the surrounding spacer panels to bridge the openings resulting from the stretching operation; and FIG. 10 is a front elevational detail view of the grill area of the automotive vehicle of FIG. 9, particularly illustrating the use of spacer panels at opposite sides of the grill.

DESCRIPTION OF THE PREFERRED EMBODIMENT

Referring now to the drawings, and particularly to FIGS. 1, 2, 5, 6 and 7, there is illustrated an automotive vehicle popularly known as a "van". The present method discloses a system for cutting through various components of the vehicle to permit the cut portions to be moved apart or separated to "stretch" the vehicle, the distance of separation being referred to for convenience as the "stretch distance".

Although not shown, it will be apparent that the vehicle is securely held in a suitable system of jigs and fixtures so that the cut portions can be stabilized during the cutting and separating operations, preparatory to the fitting of various spacer means between the cut portions to bridge the stretch distance. A description of such jigs and fixtures and certain other aspects of the stretching operation are omitted for brevity since they do not form a part of the present invention.

In a typical stretch operation, the roof, radiator, front and rear bumpers, grill, hood, passenger seats, windshield, windshield wiper assemblies, instrument panel and associated wiring and rear doors are removed. As will be seen, as many of these components as possible are kept for reuse to reduce the costs of the stretch operation, although some must be discarded.

Also omitted from the present disclosure are details respecting the fitting of a new roof to the stretched vehicle. The new roof is configured to increase head room and facilitate use of the stretched vehicle as a mini-bus, for example. Also omitted is a description of the many different ways in which the interior of the vehicle can be fitted with particular equipment and seating arrangements to suit specific applications.

The vehicle disclosed in the drawings is a simplified showing of a Dodge van manufactured by Chrysler Corporation, and the stretching operation produces a vehicle which is 14 inches wider, or approximately 95 inches. In addition to the increased interim dimensions, the stability of the vehicle is also increased because, as will be seen, the wheels are also moved apart in the amount of the stretch distance.

The automotive vehicle or van, generally designated by the numeral 10, includes a body 12 having a rear lower panel 14 defining the lower terminus of a rear door opening 16; roof rear and front headers 18 and 20, respectively, which extend transversely and support the rear and front of the roof; a frame 22 having a floor 24 and a plurality of transverse frame members 26; a fire wall 28 located between the passenger compartment and the engine compartment 30 at the forward extremity of the floor 24; a transverse dash mount 32 to which the usual instrument panel (not shown) is fitted, and which includes a pair of hood mounts (not shown) on its front side; a hood 34 which overlies the engine compartment 30; a right rear axle 36 extending to the right of the usual differential 38; a steering linkage system including a right steering rod 40; a suspension system which includes a right front wheel suspension element 42 pivotally mounted to the body 12 at a suspension mount point 44; a front axle 46; a heater/air conditioner assembly 48 mounted to the fire wall 28 to the right of the longitudinal center line 50 of the body 12; and an engine 52 mounted to the body 12 along the center line 50.

A cut is now made through the van 10 along a generally longitudinally oriented predetermined cut line, indicated in phantom outline, having laterally off-set cuts or portions to clear certain components of the van 10, as will be seen. The cut line includes a cut 56 through the rear lower panel 14, as seen in FIG. 1; a cut 58 through the rear header 18; a cut 60 through the front header 20; and a cut 62 through the floor 24 and transverse frame members 26. The cut 62 extends to the right of the differential 38 as it proceeds toward the front of the vehicle, and is jogged or offset to the right in the vicinity of the engine 52, passing through the firewall 28 to the right of the heater/air-conditioner assembly 48.

The cut 62 next extends generally to the left, then forwardly and upwardly through the dash mount 32, as indicated at 64.

Cuts along the predetermined cut line are also made through the right rear axle 36, the right steering rod 40 and the front axle 46.

The inner end of the right front wheel suspension element 42 is temporarily dismounted from its suspension mount point.

Although not illustrated, the original upper hood panel located above the hood is removed and discarded. In addition, the existing dash mount assembly is cut away to remove the original hood mounts.

The resulting cut portions of the van 10 are now moved apart on the associated jigs and fixtures (not shown) a predetermined stretch distance, which is generally indicated in several of the views by the numeral 66. This distance is normally approximately 14 inches in the case of the Dodge van disclosed.

The stretched or separated state of the cut portions of the van 10 is illustrated in FIG. 2.

The more or less straight cut line employed in one system of the prior art is designated generally at 68 in FIG. 4, it being noted that this cut line passes very close to the engine 52, and also between the engine 52 and the heater/air-conditioner assembly 48. As a consequence, the engine housing had to be reworked or replaced, and all of the cables, hoses, and similar interconnections between the engine 52 and the heater/air-conditioner assembly 48 had to be replaced or fitted with extensions to bridge the stretched distance, all of which resulted in undesirable increased costs and increased production times. In contrast, the cut 62 of the present method, as shown in FIG. 1, eliminates these problems by passing to the right of the engine housing and the heater/air-conditioner assembly 48.

A new suspension mount point 44 is provided on the van body 12, as seen in FIG. 5, to pivotally mount the now more laterally outwardly located inner end of the right front wheel suspension element 42.

Spacer elements are now fitted between the cut portions of the vehicle. As seen in phantom outline in FIG. 3, a spacer panel 70 is attached between the cut portions of the rear lower body panel 14 to bridge the stretch distance 66 therebetween. Similar spacer means are utilized to bridge the stretch distance between other of the components, including a new axle drive component (not shown) for the right rear axle and a surrounding axle sleeve 72. A spacer sleeve 74 is fitted to the right steering rod 40 and a front axle spacer 76 is attached between the cut portions of the front axle 46.

Spacer sections 78 and 80 are employed to bridge the stretch distances between the cut portions of the rear header 18 and front header 20, respectively.

Likewise, floor and frame member spacers are attached to the cut portions of the floor 24 and frame members 26, these spacers being generally indicated by the numeral 82. A firewall spacer 84 and a dash mount spacer 86 are mounted between the cut portions of the firewall 28 and dash mount 32 to fill in the stretch distance between them, as indicated generally in FIG. 8.

The foregoing operations utilize well-known body shop tools and techniques, the cutting being accomplished by using, for example, a power disc saw, hack saw, and cutting torch. The installation of the spacer elements is generally by welding, followed by grinding of the surfaces to prepare them for painting or the like.

As previously indicated, the cut line technique used in the prior art involved installation of spacers in the dash mount and relocation of the hood mounts for remounting and using the original hood. However, the relocation of the hood mounts frequently required a very considerable amount of reworking and adjustment to precisely locate the hood mounts for proper pivotal mounting of the hood.

According to the present method, a transversely extending adapter element 88, having an integral pair of precisely located hood mounts 90, is welded or otherwise attached to the remaining portion of the original dash mount to provide the dash mount 32, as seen in FIG. 6. The outer ends of the adapter element 88 terminate adjacent the front fender structure of the van 10, completely bridging or spanning the engine compartment 30.

The original hood 34 can then be mounted to the hood mounts 90, as seen in FIG. 7. A new upper hood panel 91, preferably fabricated of a glass fiber laminate, is attached to the dash mount 32 to span the upper portion of the engine compartment 30. A pair of hood side panels 92 are attached to the adjacent fender structure on opposite sides of the hood 34, extending downwardly from the upper hood panel 91 and each bridging one-half of the stretch distance, as will be apparent.

Certain of the previously removed vehicle components are reinstalled, using suitable spacers and extensions where necessary, such components including the front and rear bumpers.

The original windshield (not shown) is cut to span half the new width of the windshield opening. A similarly dimensioned windshield is oppositely cut and installed in the other side of the windshield opening. The adjacent edges of the two windshield sections abut against and are supported by a windshield post 94.

As seen in FIG. 3, door spacer panels 96 are fitted to the side margins of the widened or stretched rear door opening 16 to define a new rear door opening of the same width as the original opening so that the original door or doors can be reinstalled.

As seen in FIG. 10, the supporting structure for the original grill 98 is cut along the lines 100 and 102. Grill spacer panels 104 are then attached between the side edges of the grill 98 and the adjacent vehicle front light mounts 106 so that the resulting assembly offers no evidence of the vehicle having been cut and stretched.

The method of the present invention thus greatly facilitates the cutting and stretching of an automotive vehicle, and provides critical reductions in cost and production time which makes such stretched vehicles available to a much broader market.

Various modifications and changes may be made with regard to the foregoing detailed description without departing from the spirit of the invention.

I claim:

1. Method for widening an automotive vehicle of the type having transversely oriented components which include: a floor and transverse frame members, a fire wall adjacent the forward extremity of said floor, a transverse first dash mount having a first pair of hood mounts, a first upper hood panel mounted to said dash mount and a hood pivotally mounted to said hood mounts; a heater/air conditioner assembly mounted to said firewall to the right of the longitudinal centerline of said vehicle; and an engine oriented along said longitudinal centerline, said method comprising the steps of:

temporarily demounting said hood from said hood mounts;

cutting through said components of said automotive vehicle along a predetermined cut line extending the complete length of said vehicle and including a cut which extends through said floor and said transverse frame members along a line located to the right of said engine, said cut line further including a cut through said fire wall and said dash mount, said cut through said fire wall being located to the right of said heater/air conditioner assembly;

removing and discarding said first upper hood panel;

moving the cut portions of said vehicle apart a predetermined stretch distance;

attaching floor and frame member spacer means between the cut portions of said floor and frame members, respectively, to bridge said stretch distance therebetween;

attaching fire wall spacer means between the cut portions of said fire wall to bridge said stretch distance therebetween;

attaching dash mount spacer means between the cut portions of said first dash mount to bridge said stretch distance therebetween;

attaching transversely extending adapter means to said dash mount, said adapter means having a substitute pair of hood mounts in replacement of said first pair of hood mounts;

attaching to said dash mount and said adapter means a second upper hood panel having hood mount openings;

remounting said hood through said hood mount openings to said substitute pair of hood mounts; and mounting a pair of hood side panels on opposite sides of said hood and extending downwardly from said upper hood panel, each to bridge one-half of said stretch distance.

2. Method for widening an automotive vehicle of the type which includes: a body having a rear lower body panel, a roof rear header, a roof front header, a frame having a floor and transverse frame members, a fire wall adjacent the forward extremity of said floor, a transverse first dash mount having a first pair of hood mounts, a first upper hood panel mounted to said dash mount and a hood pivotally mounted to said hood mounts; a right rear axle; a right steering rod; a right front wheel suspension element pivotally mounted between the right front wheel and a suspension mount point on said body; a front axle; a heater/air conditioner assembly mounted to said firewall to the right of the longitudinal centerline of said body; and an engine mounted to said body along said longitudinal centerline, said method comprising the steps of:

temporarily demounting said hood from said hood mounts;

cutting through said automotive vehicle along a predetermined cut line including a cut through said rear lower body panel, said roof rear header, said roof front header, said floor and said transverse frame members, said cut through said floor and said transverse frame members adjacent and forwardly of said engine being located to the right of said engine; said cut line further including a cut through said fire wall and said dash mount, said cut through said fire wall being located to the right of said heater/air conditioner assembly; said cut line further including a cut through said right rear axle, said right steering rod and said front axle;

removing and discarding said first upper hood panel;

demounting said right front wheel suspension element from said body;

moving the cut portions of said vehicle apart a predetermined stretch distance;

mounting said right front wheel suspension element on said body a distance to the right of said suspension mount point equal to said stretch distance;

attaching spacer panel means between the cut portions of said rear lower body panel to bridge said stretch distance therebetween;

attaching spacer header means between the cut portions of said roof rear and front headers, respectively, to bridge said stretch distance therebetween;

attaching spacer means between the cut portions of said rear axle, steering rod, and front axle, respectively, to bridge said stretch distance therebetween;

attaching floor and frame member spacer means between the cut portions of said floor and frame members, respectively, to bridge said stretch distance therebetween;

attaching fire wall spacer means between the cut portions of said fire wall to bridge said stretch distance therebetween;

attaching dash mount spacer means between the cut portions of said first dash mount to bridge said stretch distance therebetween;

attaching transversely extending adapter means to said dash mount, said adapter means having a substitute pair of hood mounts in replacement of said first pair of hood mounts;

attaching to said dash mount and said adapter means a second upper hood panel having hood mount openings;

remounting said hood through said hood mount openings to said substitute pair of hood mounts; and mounting a pair of hood side panels on opposite sides of said hood and extending downwardly from said upper hood panel, each to bridge one-half of said stretch distance.

3. The method according to claim 2 wherein said vehicle includes a rear door structure carried within a rear door opening, and including the step of mounting a pair of rear door side panels on opposite sides of said rear door opening, each to bridge one-half of said stretch distance to enable remounting of said rear door structure.

4. The method according to claim 2 wherein the front of said vehicle includes a transversely extending grill carried by grill supporting structure, and including the step of cutting through said grill supporting structure at opposite sides of said grill, separating the cut portions of said grill supporting structure at each side of said grill a distance which defines an opening having a width of one-half said stretch distance, and mounting a pair of grill spacer panels in the pair of openings, respectively.

5. The method according to claim 2 wherein said vehicle includes a windshield, and including the step of cutting said windshield to fit within approximately one-half the stretched width of the windshield opening, and supporting the cut edge with a center post secured between said roof front header and said dash mount; and cutting another said windshield to fit within the other side of said windshield opening.

* * * * *